No. 730,767. PATENTED JUNE 9, 1903.
A. HERISSON.
FRICTION CLUTCH.
APPLICATION FILED DEC. 30, 1902.
NO MODEL. 2 SHEETS—SHEET 2.
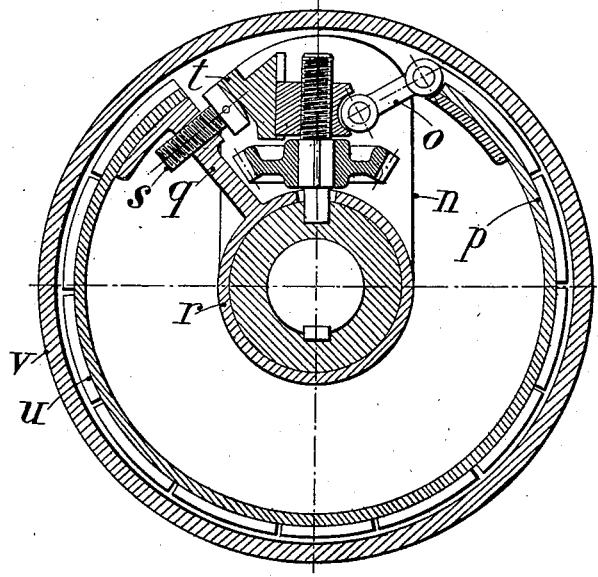

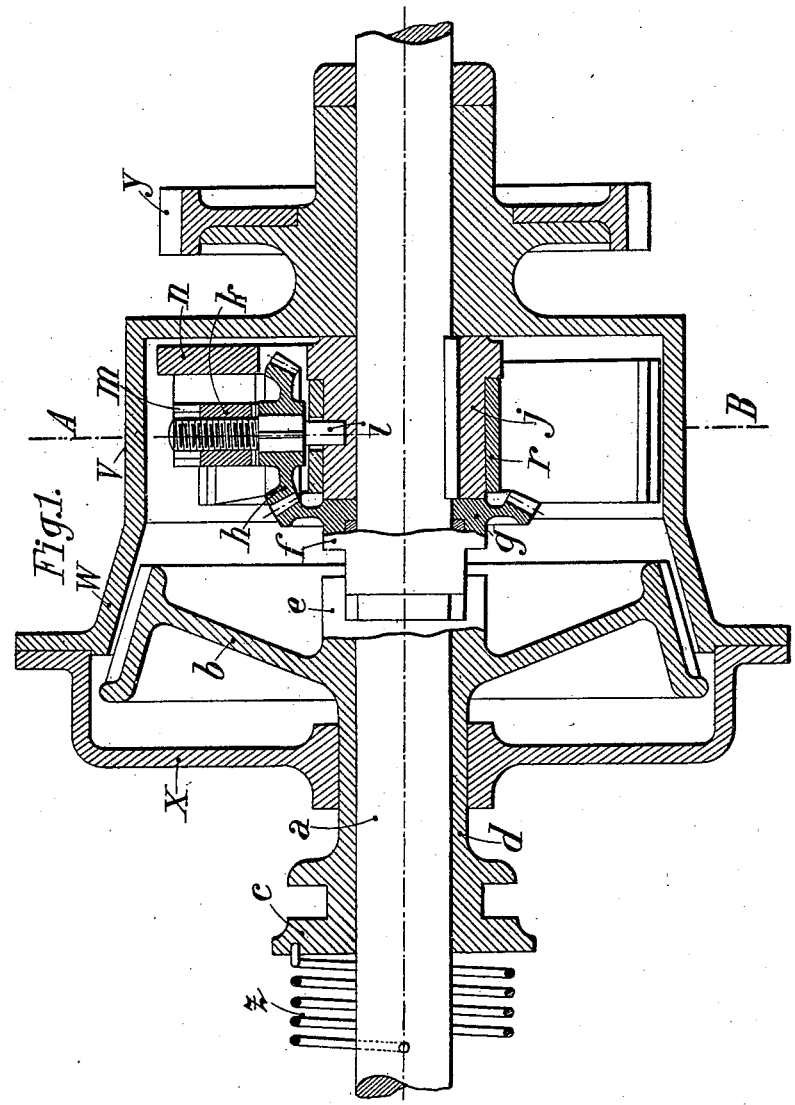

No. 730,767.

Patented June 9, 1903.

UNITED STATES PATENT OFFICE.

ALBERT HERISSON, OF NIMES, FRANCE.

FRICTION-CLUTCH.

SPECIFICATION forming part of Letters Patent No. 730,767, dated June 9, 1903.

Application filed December 30, 1902. Serial No. 137,189. (No model.)

*To all whom it may concern:*

Be it known that I, ALBERT HERISSON, engineer, a citizen of the Republic of France, residing at 2 Place de l'Esplanade, Nimes, Gard, France, have invented certain new and useful Improvements in Friction-Clutches, of which the following is a specification.

This invention relates to friction-clutches, and has for its object to provide a clutch of this character which is simple in construction and durable and efficient in action.

The invention comprises a cup loosely mounted on the shaft to which rotation is to be transmitted and a friction element rigidly mounted on said shaft, said friction element being adapted to be thrown into engagement with said cup to transmit the motion of said cup to said shaft.

The invention particularly resides in novel means for throwing said friction element into engagement with said cup and for releasing it from its engagement therewith.

Other objects and advantages of the invention will be apparent from the following detail description and will be set forth in the claims.

In the drawings forming a part of this specification, Figure 1 is a longitudinal sectional view, partly in elevation, of my improved friction-clutch; and Fig. 2 is a transverse section on the line A B of Fig. 1.

Like reference characters indicate like parts in the two figures of the drawings.

The reference-letter $a$ indicates the shaft to which rotation is to be imparted. Mounted upon the shaft $a$ is a cup $v$, which is provided with a conical extension $w$ and a gear-wheel $y$. Attached to the conical extension $w$ of the cup $v$ is a second cup $x$, which rotates with the cup $v$ and is hermetically connected thereto. The cups $v$ and $x$ are loosely mounted upon the shaft $a$, so that they can be rotated thereupon without transmitting motion to the shaft $a$ unless they are geared thereto, as will be hereinafter described. Motion is transmitted to the cup $v$ through the gear-wheel $y$ from any suitable source of power. It will be understood, of course, that other means than the gear-wheel $y$ may be provided for transmitting motion to the cup $v$.

Rigidly mounted upon the shaft $a$, so as to revolve therewith, is a sleeve $j$, in which is mounted a shaft $i$, which extends in a direction transverse to the axis of the shaft $a$. The shaft $i$ freely revolves in a socket in the sleeve $j$ and is screw-threaded at its outer end, as shown in Fig. 1.

Rigidly attached to the inner end of the shaft $i$ is a bevel-wheel $h$, through which said shaft $i$ is rotated on the sleeve $j$. Mounted upon the screw-threads of the shaft $i$ is a nut $k$, which is provided with a notch fitting over a projection 2 on an arm $n$, which is rigid on the sleeve $j$. By providing the nut $k$ with a notch fitting over the projection $m$ said nut is prevented from rotating and is only permitted to move in a longitudinal direction on the shaft $i$, as said shaft is rotated by means of the bevel-wheel $h$ in a manner hereinafter to be described.

Surrounding the sleeve $j$ is a second sleeve $r$, which is provided with an outwardly-extending arm $q$. It will be observed that the sleeve $r$ is provided with an aperture for the passage of the shaft $i$. Attached to the outer end of the arm $q$ on the sleeve $r$ is a friction element $p$ in the form of a circular band, which extends around the inner periphery of the cup $v$ and is provided with a series of segmental friction-pieces $u$, as shown in Fig. 2. Passing transversely through the arm $q$ of the sleeve $r$ is an adjusting-screw $s$, the head of which abuts against a projection $t$ on the arm $n$ of the sleeve $j$. By turning this nut $s$ in one direction or the other the arm $q$ will be adjusted toward or from the projection $t$, and the tension of the friction element $p$ will be regulated as desired. Attached to the end of the friction element $p$, opposite to the arm $q$, is a short rod $o$, which is journaled to said friction element $p$ at one end, as shown, and is journaled at its opposite end to the nut $k$ on the shaft $i$, as is clearly shown in Fig. 2 of the drawings.

Loosely mounted upon the shaft $a$ is a sleeve $d$, which is provided at one end with a conical projection $b$. It will be observed that the outer periphery of the conical projection $b$ is of approximately the same diameter as the inner periphery of the conical extension $w$ of the cup $v$. The sleeve $d$ extends between the cup $x$ and the shaft $a$, as shown in Fig. 1, and it will be understood that the cup $x$ freely revolves upon the sleeve $d$. The sleeve $d$ is movable in a longitudinal direction upon the shaft $a$ by means of a forked lever (not shown) fitting into the contracted portion $c$ of the sleeve $d$. At the end of the sleeve $d$, adjacent to the conical extension $b$, is a plurality of claws $e$, which engage the claws of a sleeve $f$, that is loosely mounted upon the shaft $a$, and rotate said sleeve $f$ with the sleeve $d$. The sleeve $f$ is provided with a bevel-wheel $g$, which meshes with the bevel-wheel $h$, rigidly mounted on the shaft $i$.

Adjacent to the end $c$ of the sleeve $d$ is a spring $z$, which is spirally wound on the shaft $a$. One end of the spring $z$ is rigidly connected to the end $c$ of the sleeve $d$, and the other end of said spring is rigidly attached to the shaft $a$, as shown.

Constructed as above described the operation of my clutch mechanism is as follows: The cup $b$, with the cup $x$ hermetically attached thereto, is rotated by any suitable means, such as a motor or the like, and it is intended that the motion of the cup $v$ shall be transmitted to the shaft $a$. In order to effect this result, the forked lever, which engages the contracted portion $c$ of the sleeve $d$, is moved to the right, so as to throw the conical extension $b$ on the sleeve $d$ into engagement with the conical portion $w$ of the cup $v$. This action causes the conical extension $b$ and the sleeve $d$ to rotate with the cup $v$, and the rotation of the sleeve $d$ causes the rotation of the sleeve $f$ and bevel-wheel $g$. The bevel-wheel $g$ in turn rotates the bevel-wheel $h$ and shaft $i$, which rotation of the shaft $i$ causes the nut $k$ to move outwardly thereupon and through the rod $o$ press the friction element $p$ against the inner periphery of the cup $v$, as will be readily understood. This engagement of the friction member $p$ with the inner periphery of the cup $v$ will transmit the motion of the cup $v$ to the shaft $a$ through the sleeve $j$ and shaft $i$.

It will be understood that when the conical extension $b$ of the sleeve $d$ is first thrown into engagement with the inner periphery of the conical extension $w$ and before the nut $k$ has been operated through the bevel-wheels $g$ and $h$ to throw the friction element $p$ into engagement with the cup $v$, thus operating the shaft $a$, the sleeve $d$ will make one or more revolutions upon the shaft $a$ before the friction member $p$ effectually engages the cup $v$, and these revolutions of the sleeve $d$ on the shaft $a$ serve to place the spring $z$ under tension. When it is desired to disengage the friction element $p$ from the cup $v$ and cease transmitting the motion of the cup $v$ to the shaft $a$, it is only necessary to move the lever which engages the contracted portion of the sleeve $d$ to the left. This motion causes the conical extension $b$ on the sleeve $d$ to move away from the conical extension $w$ of the cup $v$, and as soon as said sleeve $d$ is disengaged from the extension $w$ the tension of the spring $z$ operates to rotate said sleeve $d$ in the reverse direction, and this reverse rotation of the sleeve $d$ serves through the bevel-wheels $g$ and $h$ to rotate the shaft $i$ in the reverse direction, move the nut $k$ inwardly, and release the engagement of the friction member $p$ with the inner periphery of the cup $v$.

By hermetically connecting the cup $x$ to the cup $v$, as described, I provide an oil-chamber which is effective in lubricating the different parts of my improved clutch.

Having thus described my invention, what I claim as new, and desire to secure by Letters Patent, is—

1. In a friction-clutch the combination of a shaft, a transversely-extending screw-threaded shaft revolubly mounted on said first-mentioned shaft, a nut on said screw-threaded shaft, means for preventing rotation of said nut while permitting longitudinal movement thereof on said screw-threaded shaft, a friction element connected at one end with said first-mentioned shaft, and at the other end with the nut on said transversely-extending screw-threaded shaft, a bevel-wheel rigidly mounted on said screw-threaded shaft, a sleeve loosely mounted on said first-mentioned shaft, a bevel-wheel on said sleeve meshing with the bevel-wheel on said screw-threaded shaft, a friction-clutch member loosely mounted on said first-mentioned shaft, and means for throwing said sleeve and said clutch member into engagement with each other.

2. In a friction-clutch the combination of a shaft, a sleeve rigidly mounted on said shaft, a screw-threaded shaft revolubly mounted on said sleeve, a nut on said screw-threaded shaft, means for preventing rotation of said nut while permitting longitudinal movement thereof on said screw-threaded shaft, a second sleeve surrounding said first-mentioned sleeve, and having an aperture through which said screw-threaded shaft extends, an arm on said second sleeve, an adjusting-screw extending through the arm of said second sleeve and abutting against the arm on said first-mentioned sleeve, a friction element connected at one end with the arm on said second sleeve and at the other end with the nut on said screw-threaded shaft, a bevel-gear rigidly connected with said screw-threaded shaft, a third sleeve loosely mounted on said first-mentioned shaft, a bevel-gear on said third sleeve, a fourth sleeve loosely mounted on said first-mentioned shaft, a conical extension on said fourth sleeve, means for imparting the rotation of said fourth sleeve to said third sleeve, a spiral spring connected at one end to said fourth sleeve and at the other end to said first-mentioned shaft, means for moving said fourth sleeve longitudinally on said first-mentioned shaft so as to throw it into and out of engagement with said third sleeve, a friction-cup loosely mounted on said first-mentioned shaft, a bevel-wheel on said friction-cup, a conical extension on said friction-cup, and a second cup surrounding
5 said fourth sleeve and hermetically connected to the conical extension of said first-mentioned cup.

In testimony whereof I have hereunto set my hand in presence of two subscribing witnesses.

ALBERT HERISSON.

Witnesses:
EDWARD P. MACLEAN,
EMILE KLOBE.